UNITED STATES PATENT OFFICE.

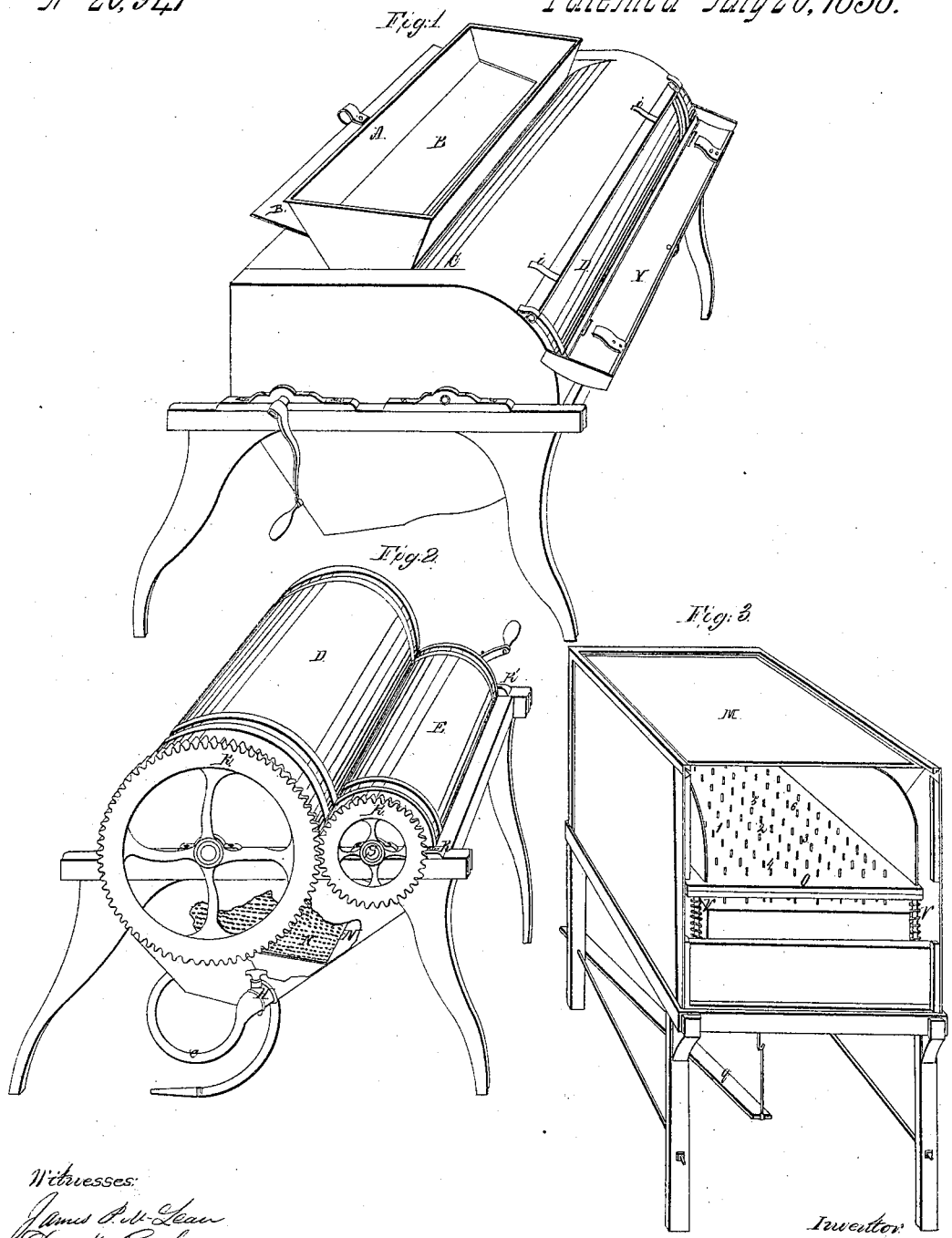

H. KRAUSE, OF NEW YORK, N. Y.

MACHINE FOR PRESSING GRAPES.

Specification of Letters Patent No. 20,947, dated July 20, 1858.

*To all whom it may concern:*

Be it known that I, HENRY KRAUSE, of New York city, in the county and State of New York, have made certain novel and useful Improvements in Apparatus for Pressing Grapes; and I hereby declare the following to be a full, clear, and exact description thereof, reference being had to the accompanying drawings, which drawings are lettered to correspond with and constitute a part of this specification.

To enable others skilled in the art of manufacture to construct and use my invention I will describe as follows.

*Description.*

Figure 1 is a perspective view of my machine for pressing grapes. Letter (A) is the hopper to receive the grapes. (B) is a slide which regulates the feed to the rollers or presses. The ends of the hopper (A) which pass down between the rollers (D, E,) are perforated in order to allow the juice that may accumulate to pass into the mill. Letter (C) is the covering over the rollers (D, E,). Letter (F,) is a scraper which is attached to the cover (C) by means of two springs (i, i,) these springs press the scraper against the soft roller (D) thereby relieving the roller of the seeds, skins, &c., of the grapes thus keeping the soft roller perfectly clean and in the most favorable condition for pressing.

Fig. 2, is a perspective view of the rollers or mill showing the cogged gearing (K, K',) which is operated by the crank or other power at the opposite end of the roller (E) which roller is made to move nearer to or farther from the soft roller (D) by means of slots and screws (R, R,) that secure the boxes and shaft (s) to the frame. Letter (N) is a perforated plate that runs transversely through the lower section of the press (or wine receiver) and acts as a strainer thus separating the seeds and skins of the grapes from the pure juice in the wine receiver from whence the juice is drawn off through the stop cock (H) and the discharging pipe (e) into casks, &c.

The grapes pass from hopper (A) Fig. 1, down between the soft roller (D) and the hard roller (E) where they are thoroughly mashed or squeezed but the skins and seeds adhere to the soft flexible roller (D) and not to the hard roller (E). The advantage of the soft roller is that the seeds are preserved without being broken consequently do not give that bitter taste so common in wine. The skins and seeds are scraped off the soft roller by the scraper (F) and thrown out of the door (Y). The juice passes down through the strainer (N) into the receiver, from thence through pipe (e) to the casks.

I do not claim to be the inventor of rollers for pressing grapes operated by cranks cogged gearing, &c.; but

What I claim as novel and what I wish to secure by Letters Patent of the United States is—

The soft roller (D,) in combination with the adjustable hard roller (E) arranged and operated by means of the cogged gearing in the manner and for the ostensible purpose substantially as described and shown in the drawings.

In testimony whereof I hereunto subscribe my name in the presence of two witnesses.

HENRY KRAUSE.

Witnesses:
DAVID CROWTHER,
JAMES P. McLEAN.